W. G. CANION.
AUTOMATIC AIR BRAKE FOR RAILWAY CARS.
APPLICATION FILED JUNE 10, 1913.

1,099,841.

Patented June 9, 1914.

Inventor,
William G. Canion.
By Victor J. Evans,
Attorney.

Witnesses
Christ Peinle, Jr.
J. W. Garner

UNITED STATES PATENT OFFICE.

WILLIAM G. CANION, OF EL PASO, TEXAS, ASSIGNOR TO ARIZONA AUTOMATIC AIR ASSOCIATION, OF BISBEE, ARIZONA, A CORPORATION OF ARIZONA.

AUTOMATIC AIR-BRAKE FOR RAILWAY-CARS.

1,099,841.    Specification of Letters Patent.    Patented June 9, 1914.

Application filed June 10, 1913. Serial No. 772,833.

*To all whom it may concern:*

Be it known that I, WILLIAM G. CANION, a citizen of the United States, residing at El Paso, in the county of El Paso and State of Texas, have invented new and useful Improvements in Automatic Air-Brakes for Railway-Cars, of which the following is a specification.

This invention is an improved automatic air brake for railway cars and consists in the construction, combination and arrangement of devices hereinafter described and claimed.

The object of this invention is to provide an improved automatically operating emergency relief valve which may be attached directly to the brake cylinder of an air brake apparatus, independently of the train pipe and which enables the usual triple valve to be dispensed with and which in an emergency greatly accelerates the action of the brake apparatus and which also enables the brake apparatus of all of the cars of a train to operate simultaneously, another object being to provide an improved air brake apparatus of this class which may be used in connection with an automatic air brake apparatus of standard type, so that a car equipped with my improved air brake apparatus may be coupled to and used in connection with other cars equipped with the usual standard type of air brake apparatus.

Figure 1:
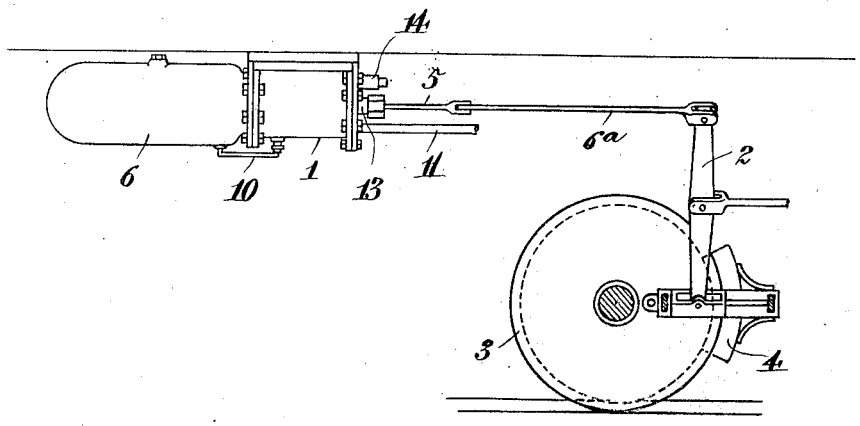
Figure 2:
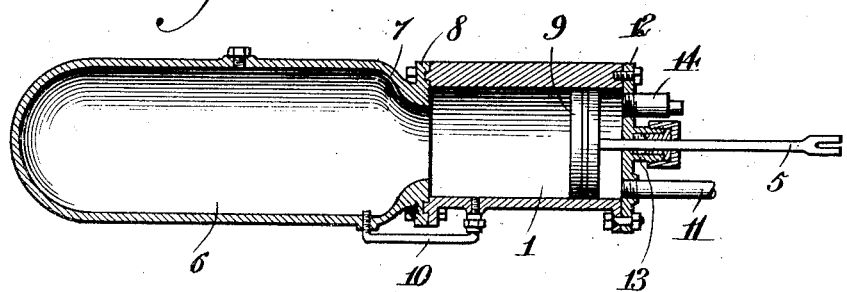
Figure 3:
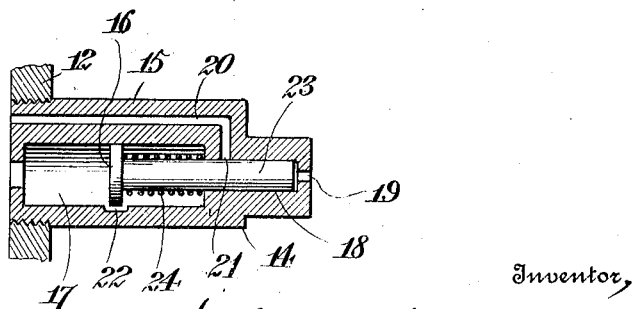

In the accompanying drawings: Figure 1 is a diagrammatic elevation of air brake apparatus constructed in accordance with my invention. Fig. 2 is a vertical longitudinal central sectional view through the brake cylinder and through my improved emergency relief valve and illustrating the construction of the interior parts of my brake apparatus. Fig. 3 is a detail sectional view, on a larger scale of my improved emergency relief valve.

For the purposes of this specification I show in Fig. 1 of the drawings a brake cylinder 1, a brake lever 2, a car wheel 3 and a brake shoe for application to the car wheel at 4, the brake lever being connected to the piston rod 5 by a rod 6ª.

In accordance with my invention I provide what I will term an auxiliary reservoir 6 which is here shown as closed at its rear end and provided with a neck 7 at its front open end, which neck is provided with an outstanding flange 8 bolted directly to the rear open end of the cylinder 1. This neck forms a communicating passage between the reservoir 6 and the rear end of the cylinder 1 and also forms a stop to limit the movement of the piston 9 when the latter moves rearwardly in the cylinder 1 to brake releasing position. A bypass connection of reduced capacity is provided between the reservoir 6 and the cylinder 1 and around the piston when the latter is at release position, and in the inner end of the cylinder. This bypass connection 10 is here shown as a suitable pipe. The usual train pipe 11 is here shown as connected to the outer head 12 of the brake cylinder, the said head being provided with the usual stuffing box 13 for the piston rod 5. I also, in accordance with my improved invention provide an emergency relief valve 14 which comprises a casing 15 and a plunger 16. The inner end of the casing is threaded directly in an opening in the head of the cylinder 1, and independently of and out of direct communication with the train pipe 11 and this casing is provided with a longitudinal cylindrical bore 17 and with a cylindrical passage 18 concentric with the bore and which extends from the outer end thereof nearly to the outer end of the casing, a discharge port 19 of reduced capacity being provided at the outer end of the said passage to connect the passage and the bore of the casing and hence also the outer end of the brake cylinder 1 directly with the outer air and independently of the train pipe 11 as will more fully presently appear. The valve casing 15 also has a bypass 20 of reduced capacity which communicates at its inner end directly with the outer end of the cylinder 1 and at its outer end communicates with the discharge passage 18 at a point intermediate the ends of said passage as at 21. The casing 15 is also provided, in one side of its bore 17 and at a point intermediate the ends of its bore or cylindrical chamber with a bypass 22 of reduced capacity.

The plunger 16 which is fitted and arranged to operate in the bore or chamber 17 of the valve casing is provided with a plug 23 which forms a closure for and is snugly fitted in the passage 18 and is adapted to be moved longitudinally in said passage to open or cover the port 21 of the bypass 20 according to the position and movements of the plunger. The bypass 22 permits compressed air from the cylinder 1 to pass from the rear or inner end of the valve chamber 17 around the plunger and to the front side of the latter and in the front or outer end of said chamber so that the plunger will be acted upon from both sides by compressed air. The plug 23 which projects from the front side of the plunger, to the extent of its cross sectional area reduces the superficial area of the front side of the plunger exposed to the action of the compressed air, as compared with the rear side of said plunger, which is unobstructed, and hence there will be a slight preponderance of air pressure on the rear side of said plunger. To compensate for this inequality of air pressure on opposite sides of the valve plunger I provide a light spring 24 which is arranged around the plug 23 and bears between the front side of the plunger and the shoulder formed around the passage 18 and at the front end of the valve casing bore or chamber 17.

In the operation of my improved brake apparatus, when pressure is reduced in the brake cylinder 1, in front of the piston 9, through the train pipe 11 and by the action of the engineer's valve in the usual way, the piston will be forced forwardly by the preponderance of pressure in the reservoir 6 and behind the piston and the brakes will be applied. The brakes are released when the engineer increases the air pressure of the train pipe, this pressure serving to move the piston 9 rearwardly and when the piston reaches the inner or rear end of the brake cylinder 1, compressed air then passes through the bypass connection 10 around the piston and into the reservoir 6 which forms practically a rear extension of the brake cylinder 1, so that the said reservoir is under all conditions kept supplied with compressed air at working pressure, usually about 70 pounds to the square inch.

Ordinary operations of the brake apparatus and such as above described do not affect my emergency valve and the plunger 16 thereof normally remains in an intermediate position in the bore 17 and with its plug 23 across and closing the port 21 of the bypass 20. When however the train pipe is opened widely by the operation of the engineer's valve and for quick application of the brakes the ensuant reduction of pressure in the front end of the brake cylinder causes a corresponding reduction of pressure behind the valve plunger 16 and hence the preponderating air pressure on the front side of said valve plug and in the front portion of the bore 17 causes the valve plunger to move inwardly or rearwardly, thus withdrawing its plug 23 in the passage 8 and opening the port 21 so that air pressure is further and directly relieved in the front end of the brake cylinder through the bypass 20 and passage 18, the action of the valve being such as to cause compressed air to be discharged from the front end of the brake cylinder directly into the outer air and independently of the train pipe so that the action of the brake apparatus is greatly accelerated and the brakes are applied with maximum force as will be understood. The same action occurs if the train pipe becomes broken or the cars become uncoupled.

It will be understood from the foregoing description that the brake apparatus of each car equipped with my improved relief valve operates simultaneously when pressure is reduced through the train pipe and hence all the cars of a train equipped with my improved apparatus will apply their brakes simultaneously when the engineer opens his valve and this is particularly advantageous on long trains as when stopping or reducing speed at the stations or when descending grades.

My improved air brake apparatus is not liable to stick and refuse to operate or operate tardily when the engineer moves his valve to release or recharging position and when a train is being stopped by my improved brake apparatus this is effected without jolting and jerking of the car.

I claim:

1. In air brake apparatus, the combination of a brake cylinder, a brake actuated piston therein, an auxiliary reservoir communicating with the inner end of the cylinder, a bypass connection of reduced capacity around the piston and between the auxiliary reservoir and cylinder at the inner end of the cylinder in which the piston is located when in release position, a train pipe connected to the outer end of the cylinder and an emergency relief valve also connected to the outer end of the cylinder and independently of the train pipe and comprising a casing forming a cylinder having a discharge passage leading from its outer end to the outer air and a duct leading from the outer end of the brake cylinder to the discharge passage at a point intermediate the ends of the latter, and a plunger in the cylinder of the valve casing and having a plug fitted and movable in the discharge passage to open and close the said duct, the valve casing cylinder being also provided with a reduced bypass around the valve plunger.

2. In air brake apparatus, the combination of a brake cylinder, a brake actuated piston therein, an auxiliary reservoir communicating with the inner end of the cylinder, a bypass connection of reduced capacity around the piston and between the auxiliary reservoir and cylinder at the inner end of the cylinder in which the piston is located when in release position, a train pipe connected to the outer end of the cylinder and an emergency relief valve also connected to the outer end of the cylinder and independently of the train pipe and comprising a casing forming a cylinder having a discharge passage leading from its outer end to the outer air and a duct leading from the outer end of the brake cylinder to the discharge passage at a point intermediate the ends of the latter, and a plunger in the cylinder of the valve casing and having a plug fitted and movable in the discharge passage to open and close the said duct, the valve casing cylinder being also provided with a reduced bypass around the valve plunger and out of communication with the said discharge passage.

3. In air brake apparatus, the combination of a brake cylinder, a brake actuated piston therein, an auxiliary reservoir communicating with the inner end of the cylinder, a bypass connection of reduced capacity around the piston and between the auxiliary reservoir and cylinder at the inner end of the cylinder in which the piston is located when in release position, a train pipe connected to the outer end of the cylinder and an emergency relief valve also connected to the outer end of the cylinder and independently of the train pipe and comprising a casing forming a cylinder having a discharge passage leading from its outer end to the outer air and a duct leading from the outer end of the brake cylinder to the discharge passage at a point intermediate the ends of the latter, and a plunger in the cylinder of the valve casing and having a plug fitted and movable in the discharge passage to open and close the said duct, the valve casing cylinder being also provided with a reduced bypass around the valve plunger, and a compensating spring for said plunger.

4. In brake apparatus, of the class described, a brake piston, a brake cylinder in which the piston operates, and having a bypass of reduced capacity around the piston when the latter is in release position, a train pipe connected to the outer end of the cylinder, and an emergency relief valve also at the outer end of the cylinder and comprising a casing having an emergency relief duct to discharge from the brake cylinder into the outer air and a normally inactive fluid pressure actuated element in the valve casing arranged to be operated by extreme variations of pressure, and controlling means for the emergency relief duct, operated by said fluid pressure actuated element.

5. In brake apparatus of the class described, a brake piston, a brake cylinder in which the piston operates, said brake cylinder having a bypass of reduced capacity around the piston when the latter is in release position, a train pipe connected to the outer end of the cylinder and an emergency relief valve also at the outer end of the cylinder and independent of the train pipe, and comprising a casing having an emergency relief duct to discharge from the brake cylinder into the outer air, a normally inactive fluid pressure actuated element in the valve casing, arranged to be operated by extreme variations of pressure, and controlling means for the emergency relief duct operated by said fluid pressure actuated element.

In testimony whereof I affix my signature in presence of two witnesses.

WILLIAM G. CANION.

Witnesses:
J. W. GARNER,
BENNETT S. JONES.